United States Patent [19]

Litzinger

[11] 4,311,115

[45] Jan. 19, 1982

[54] NOVEL AGGREGATE COMPOSITION AND METHOD FOR MAKING SAME

[75] Inventor: Paul C. Litzinger, Camas, Wash.

[73] Assignee: Crown Zellerbach Corporation, San Francisco, Calif.

[21] Appl. No.: 186,995

[22] Filed: Sep. 15, 1980

[51] Int. Cl.³ ............................................. A01K 1/015
[52] U.S. Cl. ................................................ 119/1
[58] Field of Search ..................................... 119/1

[56] References Cited

U.S. PATENT DOCUMENTS

| | | |
|---|---|---|
| 3,828,731 | 8/1974 | White .................................... 119/1 |
| 3,980,050 | 9/1976 | Neubauer ............................ 119/1 |
| 4,203,388 | 5/1980 | Cortigene et al. .................. 119/1 |
| 4,263,873 | 4/1981 | Christianson ....................... 119/1 |

Primary Examiner—Hugh R. Chamblee
Attorney, Agent, or Firm—Jerome S. Marger

[57] ABSTRACT

A novel aggregate composition is provided comprising (a) pulp mill solid waste material, and (b) partially pyrolyzed cellulosic residue, as well as a method for making same. The subject aggregate composition exhibits a high degree of water absorbency and odor absorbency, respectively, and is adapted for use as an animal litter product. The method includes the steps of forming an aqueous slurry of components (a) and (b), compressing the slurry to form a wet aggregate product, and then drying same to produce the above composition.

23 Claims, 1 Drawing Figure

NOVEL AGGREGATE COMPOSITION AND METHOD FOR MAKING SAME

BACKGROUND OF THE INVENTION

There are numerous prior art uses for solid products which absorb undesirable liquids and deodorize same. An important market for such a product is animal litter, particularly cat litter. Typically, animal litter is comprised of an absorbent substrate, which can be combined with synthetic or natural deodorizing or odor-masking compounds. Absorbent substrates include alfalfa, sand, bark, clay, diatomaceous earth, peat moss, straw, vermiculite, perlite, wood particles, and various particularized wood materials such as ground hulls, ground husks, ground corn cobs, lignocellulose and the like. Deodorizing or odor-masking compounds can range anywhere from ground chlorophyl-containing plants or synthetic scents to compounds such as zeolite or fly ash. The most desirable of the above described absorbent substrates are, however, those materials which normally are considered to be waste disposal problems. Use of these materials provides not only a new article of commerce having significant commercial value but also alleviates the disposal problem itself.

One such material which is normally a disposal problem in the pulp and paper industry is the solid waste material from paper mill treatment effluent. In one process, U.S. Pat. No. 3,980,050 to Neubauer, solid waste effluent is combined with pine bark for use in a rural environment, i.e. poultry house operations under floor wire screening, where contact resistance, odor adsorbency, and dimensional stability of the poultry litter is not critical. If, however, this material were used in, for example, a cat litter product, which is available for household use, the dried effluent coating would be tracked by the animal throughout the household area.

U.S. Pat. No. 4,157,696 to Carlberg relates to an animal litter composition and method for making same in which mill effluent waste was combined with a coal fly ash composition. Although the products of U.S. Pat. No. 4,157,696 are said to rapidly absorb and deodorize animal waste liquid, the odor adsorbing capabilities and, in some cases, the liquid absorbency, of the U.S. Pat. No. 4,157,696 pellets do not meet the criteria for those properties, as hereinafter described.

SUMMARY OF THE INVENTION

The present invention is directed to a novel, compressed aggregate composition adapted for use as an animal litter which is preferably provided in pellet form. The compressed aggregate product has a high liquid absorbency and an extremely high odor adsorbency, higher than, for example, the animal litter pellets of U.S. Pat. No. 4,157,696.

This invention contemplates utilizing waste products of the pulp and paper industry which are normally disposed of in landfill, etc. Thus, by employing the present method, not only is the new and useful product formed but environmental pollutants are eliminated as solid waste problems.

More specifically, the major components of the subject compressed aggregate composition are (a) solid waste material from a paper mill, and (b) partially pyrolyzed cellulosic residue. For purposes of this invention, "pyrolysis" is defined as subjecting organic compounds to high temperatures and decomposing same. The aggregate composition comprises reactive components (a) and (b) in a weight ratio of from about preferably 1.5:1, and more preferably from about 2.5:1, up to preferably about 15:1, and more preferably up to about 12:1.

The aggregate compositon of this invention is formed by compressing an aqueous slurry, including components (a) and (b), preferably at a total solids level of about 20% by weight, and more preferably from about 30% by weight, and most preferably from about 40% by weight, preferably up to about 80% by weight, and more preferably up to about 70% by weight, and most preferably up to about 60% by weight.

It is preferred that the compression step be conducted so that the aggregage composition after drying will exhibit a dry density of about 15 pounds per cubic foot, up to about 40 pounds per cubic foot. More specifically, the preferred dry density of the aggregate composition is from about 20 pounds per cubic foot, up to about 30 pounds per cubic foot, although a dry density of from about 30 pounds per cubic foot, up to about 40 pounds per cubic foot, can also be employed. The liquid absorbency of the compressed aggregate is unexpectedly high, especially the liquid absorbency in the preferred density range. Preferably, the liquid absorbency, as hereinafter described, is from about 90%, up to about 200%, and more preferably from about 100%, up to about 160%.

Furthermore, a total solids of preferably from about 20% by weight, and more preferably from about 30% by weight, up to about preferably 60% by weight, and more preferably up to about 55% by weight, will unexpectedly produce an aggregate composition in the preferred water-absorbency range, as previously described. This result regarding total solids versus water absorbency is unexpected since slurry total solids generally do not affect substantially the water absorbency of an aggregate material.

For purposes of this invention, the water absorption test was conducted as follows:

A tared glass tube having an inside diameter of 3 cm was used for the test. A fine mesh (approximately 150 mesh) flexible plastic screen covered one end of the tube. A second tared tube having an outside diameter of slightly less than 3 cm was inserted in the second end of the larger tube. A wire mesh (approximately 50 mesh) was glued over the end of the smaller tube. This was the end that was inserted into the larger tube. The depth to which the smaller tube was inserted was controled to provide a space of 16 cm between the two screens in the larger tube.

The space in the larger tube was filled with the pellet sample to be tested and the dry weight of the sample was recorded. The entire assembly was then quickly lowered into a large container of room temperature tap water. The screened end of the larger tube was at the bottom, and the top of the sample was 2 cm below the surface of the water. Thus, the water quickly filled the area containing the sample, covering the top of the sample to a 2-cm depth. The sample was kept immersed in the water for 2 minutes and then the assembly was quickly removed from the water. Excess water was allowed to drain from the assembly for 15 seconds, and then the entire assembly was weighed. Water abosrption was calculated by subtracting the weight of the tubes, screens, and sample from the total weight of the assembly. Percent total water absorption was calculated by dividing the total water absorption by the weight of the dry sample.

Odor adsorbency is an important property, especially in products such as animal litter. For purposes of determining the odor adsorbency, the aggregate composition of the present invention was treated with an ammonia compound, i.e., secondary butylamine, in a closed environment. Volatile amines are components of the malodorous vapors emitted by materials such as urine. Therefore, the ability of an aggregate composition to adsorb such vapors is critical in uses such as animal litter. The level of odor adsorbency of a 10-gram sample of aggregate material being tested was determined by measuring, using gas chromatographic analysis, the gas phase above the sample at secondary amine additions levels of from 20 to 10,000 microliters to determine the amount of butylamine present in the vapor phase at a given liquid addition level. The saturated vapor pressure of secondary butylamine was also determined experimentally. The amount of butylamine in the vapor phase was then divided by the value of the saturated vapor pressure to give a percent of the saturated vapor pressure. By plotting a graph of percent of the saturated vapor pressure for secondary butylamine at various butylamine addition levels for each aggregate material in question, the odor adsorbency of a given aggregate sample at varying addition levels can be compared (see hereinafter described FIG. 1).

Specifically, "odor adsorption" of a given material for purposes of this invention is determined by conducting the following test procedure:

A 10-gram sample of each material being tested is placed into a 120-ml bottle. Secondary butylamine at varying volumetric levels is added through a septum in the bottle cap. The bottle is then shaken, and allowed to set at room temperature for about 20 minutes so that equilibrium conditions can be achieved therewithin. A 1-ml sample of the vapors in the space above the sample material in the bottle is then removed. The odor level, which is a function of odor adsorbency, is equivalent to vapor pressure of the secondary butylamine in the vapor space as compared to the saturated vapor pressure of butylamine under the same test conditions. The vapor pressure in each case is then determined, using a Hewlett-Packard Model No. 5750 gas chromatograph including a flame ionization unit and an SE-30 packed column.

Based on the above discussion, it can be concluded that the lower the percent of the saturated vapor pressure of butylamine at a given secondary butylamine addition level, the lower the odor level, and the higher the odor adsorbency of the sample aggregate being tested. Thus, the subject aggregate composition has a percent saturated vapor pressure for secondary butylamine at the 200-microliter addition level of not more than about 30%, and preferably not more than about 25%, and more preferably not more than about 20%, and most preferably not more than about 15%. Furthermore, at the 1,000-microliter addition level, the percent saturated vapor pressure for secondary butylamine is not more than about 80%, and preferably not more than about 70%, and more preferably not more than about 60%, and most preferably not more than about 50%.

DETAILED DESCRIPTION OF THE DRAWING

Figure 1:
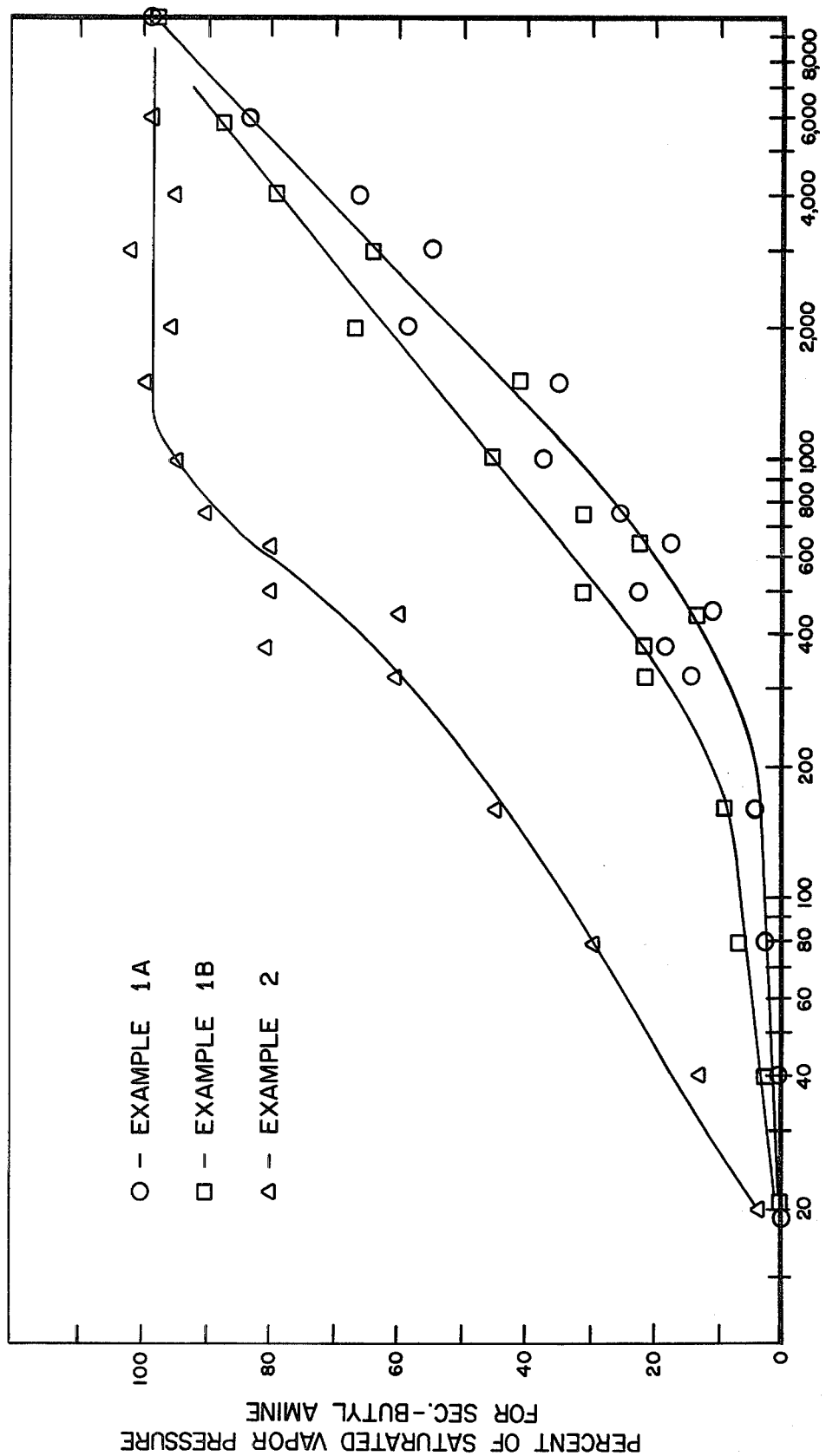

FIG. 1 is a semi-logarithmic graphic representation of the odor adsorbency of the aggregate composition produced by the novel method of this invention (Example 1) and an aggregate material produced by a prior art method (Example 2).

DETAILED DESCRIPTION OF THE INVENTION

As previously stated, the subject compressed aggregate composition comprises two components. The first, component (a), is the solid waste product from a paper mill. This solid material is typically recovered from the waste treatment system. In general, component (a) is the primary sludge or primary clarifier underflow from a paper mill waste treatment plant. The solid waste composition is generally supplied from sources such as paper machine broke, pulp mill or bleach plant spills, and floor sweepings, etc., and for the most part comprises cellulosic fibers and various nonvolatile, insoluble, inorganic waste materials. Trace amounts of other waste products from the paper mill are also present. If desired, the above solid waste material may be mechanically or thermally dried prior to further processing.

The second major component of the subject product, component (b), is partially pyrolyzed cellulosic residue. A preferred source of component (b) is wood waste residue which has been partially pyrolyzed in a paper or lumber mill hog fuel boiler. This pyrolyzed residue is "partially" pyrolyzed since it contains at least some residual, volatile, organic material to indicate odor adsorbency. Preferably, the volatile, organic material is present in the partially pyrolyzed material in an amount of from about 5% by weight, and preferably from about 10% by weight, up to about 60% by weight, and more preferably up to about 50% by weight.

The pyrolyzed cellulosic material preferably can be reduced to a granular-like state by applying minor amounts of mechanical impact forces thereto. If desired, the pyrolyzed cellulosic residue may be mechanically or thermally dried prior to combining same with the solid waste material previously described.

The subject pyrolyzed cellulosic material is quite different in composition from, for example, prior art substances employed for deodorizing purposes such as zeolite, fly ash and the like. These latter types of substances contain substantially no volatile, organic components but, instead, comprise inert, inorganic elements such as silica, alumina, iron oxide, calcium oxide, sulfur oxide, etc.

The solid waste product and pyrolyzed cellulosic material, respectively, are then combined with water to form an aqueous slurry. The weight percentage of solid waste material and combustion cellulosic residue, as well as the consistency of the aqueous slurry, have been previously described herein. The total amount of components (a) and (b), by dry weight, in the aggregate composition is preferably at least about 90%, and more preferably at least about 92%, and most preferably at least about 95%.

The aqueous slurry described above may be thermally or mechanically dried and then used per se. Alternatively, as previously described, the aqueous slurry is compressed and produces an aggregate product. Preferably, the compression step is conducted under conditions whereby the density of the aggregates is within the dry density range, as previously described.

In a preferred form of this invention, aggregates produced are in the form of pellets. These pellets can be produced using conventional pelletizing equipment such as that manufactured by Sprout-Waldron Company.

As part of the aqueous slurry, however, amounts of cellulosic-containing extenders may be included such as vegetable hulls, ground fruit pits, nut shells, etc.

Various processing aids may be added to the aqueous slurry. Typically, these materials include binders such as starch and the like, active ingredients such as deodorants and absorbents, and surfactants to impart hydrophylicity for purposes of end-use rewetting.

When the aggregate product formed by the method of this invention is a pellet, it is preferred that the maximum dimension thereof in any direction is about one inch. This permits the ready use of this material, especially in applications such as animal litter.

EXAMPLE 1

This experiment was conducted to demonstrate the production of a high density product according to the present invention.

To a 275-gallon single ribbon mixer, manufactured by J. H. Day Company of Cincinnati, Ohio, was added the following materials: 51.3 pounds of primary paper mill sludge at 97% solids (equivalent to 50 pounds of dry sludge); 33.8 pounds of partially pyrolyzed wood waste from a paper mill hog fuel burner at 37% solids (equivalent to 12.5 dry pounds of pyrolyzed cellulosic waste); and 4.2 pounds of water containing 30 cc of aerosol OT-75 surfactant, manufactured by American Cyanamid Company. After blending the above aqueous slurry for about 30 minutes, it was determined that the aqueous slurry had a total solids content of 69.8%. The slurry was then fed to a California Pellet Company mill, Master Model, equipped with a 550 die, having die-holes which were one-eighth inch in diameter and one inch in length. The pelletizer cutting knives were adjusted to cut the pellets to one-half inch, or less, in length. The resulting pellets contained a measured 69.9% total solids.

The pellets were dried in a vibrating conveyor dryer, manufactured by Dresher Industries, having a 12-inch by 10-foot dryer bed surface, and heated by forced air at 450° F. The dried pellets contained 4.6% residual moisture, and had a density of 38 pounds per cubic foot. The percent saturated vapor pressure for secondary butylamine, at 200 microliters and 1,000 microliters, respectively, for this product was about 4% and 37%, respectively (see FIG. 1).

The experimental run was repeated, except that the aqueous slurry comprised 102 pounds of primary mill sludge at 98% solids (equivalent to 100 pounds of dry sludge); 73.25 pounds of partially pyrolyzed cellulosic waste at 45.6% total solids (equivalent to 33.4 pounds of dry material; 2.66 pounds of unmodified cornstarch from National Starch and Chemical Company, and 69.4 pounds of water containing 62.0 cc aerosol OT-75. The measured solids content of the blended mixture was 57.4%. The dried pellets contained 89.8% total solids, at a density of 23.9 pounds per cubic foot, and absorbed 152.6% of their weight in water. The percent saturated vapor pressure, according to the graph in FIG. 1, for this product at 200 and 1,000 microliters of added butylamine, was 10% and 46%, respectively.

EXAMPLE 2

Experiments were conducted to determine whether the pelletized product described in U.S. Pat. No. 4,157,696 to Carlberg was comparable to the aggregate product produced by the method of this invention. The procedure employed was that described in Example 1.

The feed mix to the pelletizer was prepared by forming an aqueous slurry of the following ingredients: 22.9 pounds of primary paper mill sludge, at 98% solids (equivalent to 22.4 pounds of dry sludge); 33.6 pounds of dry fly ash, and 20.8 pounds of water. This mixture had a measured solids content of 73%, which is the moisture content described in Example 1 of the '696 patent. The dried pellets had a density of 32.2 pounds per cubic foot, which is similar to the description in Example 1 of U.S. Pat No. 4,157,696. The pellets absorbed 86.8% of their weight in moisture. The saturated vapor pressure, according to FIG. 1, for the pellets produced according to the process of U.S. Pat. No. 4,157,696, at 200 and 1,000 microliters of butylamine, was 48% and 97%, respectively.

I claim:

1. A method for forming a compressed, aggregate composition having a high degree of liquid absorbency and a high level of odor adsorbency, respectively, which comprises
   (a) forming an aqueous slurry including paper mill solid waste material and partially pyrolyzed cellulosic residue;
   (b) compressing said aqueous slurry to produce a wet aggregate product; and
   (c) drying the wet aggregate to produce said compressed aggregate composition.

2. The method of claim 1, wherein the weight ratio of waste material to partially pyrolyzed residue in the aqueous slurry is from about 1.5:1, up to about 15:1.

3. The method of claim 1, wherein said partially pyrolyzed cellulosic residue comprises from about 5%, up to about 60% by weight, based on the total weight of said residue, of volatile, organic material.

4. The method of claim 1, wherein said pyrolyzed cellulosic residue comprises from about 10%, up to about 50% by weight, of volatile, organic material.

5. The method of claim 1, wherein said aggregate composition has a density of from about 15 pounds per cubic foot, up to about 40 pounds per cubic foot.

6. The method of claim 1, wherein said paper mill solid waste material comprises primary sludge from a paper mill waste treatment plant.

7. The method of claim 1, wherein said partially pyrolyzed cellulosic residue comprises wood waste residue which has been partially pyrolyzed.

8. The method of claim 1, wherein the density of said aggregate composition is from about 15 pounds per cubic foot, up to about 30 pounds per cubic foot.

9. The method of claim 8, wherein said liquid absorbency of the compressed aggregate is from about 90%, up to about 200%.

10. The method of claim 6, wherein the total solids of the slurry is from about 20% by weight, up to about 60% by weight.

11. The method of claim 1, wherein the odor adsorbency of said compressed aggregate composition, as measured relative to the saturated vapor pressure for secondary butylamine at the 200 microliter and 1,000 microliter addition levels, respectively, is not more than about 30% and 85%.

12. The method of claim 11, wherein odor adsorbency is not more than about 25% and 75%, respectively.

13. A compressed aggregate composition having a high degree of liquid absorbency and odor adsorbency, respectively, comprising (a) paper mill solids waste material, and (b) partially pyrolyzed cellulosic residue.

14. The composition of claim 13, wherein the aggregate composition comprises from about 60%, up to about 95% by weight of said paper mill solids waste material and from about 5%, up to about 40% by weight of said partially pyrolyzed cellulosic residue.

15. The compressed aggregate composition of claim 13, wherein said paper mill solids waste material comprises primary sludge from a paper mill waste treatment plant.

16. The composition of claim 13, wherein said partially pyrolyzed cellulosic residue comprises wood waste residue which has been partially pyrolyzed.

17. The composition of claim 13, wherein ssaid pyrolyzed cellulosic residue comprises from about 5%, up to about 60% by weight of volatile, organic matter.

18. The composition of claim 17, wherein said pyrolyzed cellulosic residue comprises from about 10% to about 50% by weight of volatile, organic matter.

19. The composition of claim 13, having a density of from about 15 pounds per cubic foot, up to about 40 pounds per cubic foot.

20. The composition of claim 19, wherein said density is from about 20 pounds per cubic foot, up to about 30 pounds per cubic foot.

21. The composition of claim 20, wherein the liquid absorbency of the compressed aggregate composition is from about 90%, up to about 200%.

22. The composition of claim 13, wherein the odor adsorbency of said aggregate, measured relative to the saturated vapor pressure of secondary butylamine at the 200 microliter and 1,000 microliter addition levels, respectively, is not more than about 30% and 85%, respectively.

23. The composition of claim 22, wherein said vapor pressure is not more than about 25% and 75%, respectively.

* * * * *